United States Patent
Tseng

(10) Patent No.: US 12,086,610 B2
(45) Date of Patent: Sep. 10, 2024

(54) CLOUD DEPLOYMENT BOOT IMAGE ELECTRONIC DEVICE, AND BOOT IMAGE CLOUD DEPLOYMENT SYSTEM AND METHOD

(71) Applicant: REALTEK SEMICONDUCTOR CORP., Hsinchu (TW)

(72) Inventor: Tse-Ta Tseng, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 852 days.

(21) Appl. No.: 17/081,054

(22) Filed: Oct. 27, 2020

(65) Prior Publication Data
US 2021/0124593 A1    Apr. 29, 2021

(30) Foreign Application Priority Data

Oct. 28, 2019   (TW) ................. 108138913

(51) Int. Cl.
*H04L 9/30* (2006.01)
*G06F 8/61* (2018.01)
*G06F 9/4401* (2018.01)

(52) U.S. Cl.
CPC .............. *G06F 9/4416* (2013.01); *G06F 8/63* (2013.01); *H04L 9/30* (2013.01)

(58) Field of Classification Search
CPC ............ H04L 9/30; G06F 8/63; G06F 9/4416
USPC ........................................................ 713/189
See application file for complete search history.

(56) References Cited

U.S. PATENT DOCUMENTS

| | | | |
|---|---|---|---|
| 6,289,449 B1* | 9/2001 | Aguilar | G06F 11/1417 714/E11.133 |
| 9,348,634 B2* | 5/2016 | Allen | G06F 3/0619 |
| 9,665,380 B2* | 5/2017 | Hiltgen | G06F 9/4416 |
| 2007/0022184 A1* | 1/2007 | Sharma | H04L 63/0428 709/217 |
| 2010/0122075 A1* | 5/2010 | Chen | G06F 9/4416 713/2 |
| 2013/0084932 A1* | 4/2013 | Nelson | G07F 17/3227 463/43 |
| 2015/0046921 A1* | 2/2015 | Allen | G06F 9/4406 718/1 |
| 2015/0106606 A1* | 4/2015 | Cao | G06Q 90/00 713/2 |

(Continued)

FOREIGN PATENT DOCUMENTS

| | | |
|---|---|---|
| CN | 102939587 A | 2/2013 |
| CN | 107958155 A | 4/2018 |

*Primary Examiner* — Josnel Jeudy
(74) *Attorney, Agent, or Firm* — Birch, Stewart, Kolasch & Birch, LLP

(57) ABSTRACT

A boot image cloud deployment system and method are provided. The system includes an electronic device and a server. The server includes a storage medium and a control circuit. The electronic device is configured to issue a request instruction. The storage medium is configured to store a plurality of boot images. Each boot image includes a plurality of object files, and a combination sequence of the object files of each boot image is different from a combination sequence of the object files of the other boot images. The control circuit is configured to send back one of the boot images to the electronic device according to the request instruction. The electronic device executes the received boot image.

10 Claims, 4 Drawing Sheets

(56) References Cited

U.S. PATENT DOCUMENTS

| | | | |
|---|---|---|---|
| 2015/0178096 A1* | 6/2015 | Inbaraj | G06F 8/65 |
| | | | 713/2 |
| 2015/0234775 A1* | 8/2015 | Stevens | G06F 16/1847 |
| | | | 709/222 |
| 2015/0288659 A1* | 10/2015 | Lukacs | G06F 9/4416 |
| | | | 713/2 |
| 2017/0052795 A1* | 2/2017 | Kashyap | H04L 61/5014 |
| 2017/0357593 A1* | 12/2017 | Lau | G06F 21/51 |
| 2019/0042754 A1* | 2/2019 | Jreij | G06F 21/575 |

\* cited by examiner

CLOUD DEPLOYMENT BOOT IMAGE ELECTRONIC DEVICE, AND BOOT IMAGE CLOUD DEPLOYMENT SYSTEM AND METHOD

CROSS-REFERENCE TO RELATED APPLICATION

This non-provisional application claims priority under 35 U.S.C. § 119(a) to Patent Application No. 108138913 in Taiwan, R.O.C. on Oct. 28, 2019, the entire contents of which are hereby incorporated by reference.

BACKGROUND

Technical Field

The disclosure relates to the field of cloud boot, and in particular, to a cloud deployment boot image electronic device, and a boot image cloud deployment system and method.

Related Art

Currently, electronic devices for daily use need to execute boot images in a boot program to start an operating system and software of the electronic devices. The boot images are generally carried in the electronic devices at delivery. However, manufacturers do not customize boot images for individual electronic devices. Instead, same boot images are usually carried in electronic devices of a same model or even a same type for easy management and maintenance. However, electronic devices having same boot images possibly become attack channels for hackers due to carried same code.

When different electronic devices have same boot images, by analyzing the boot images in one of the electronic devices and finding defects in the boot images, hackers can attack other electronic devices based on these defects. Moreover, in some situations, hackers don't even need to implant malicious code into electronic devices. Instead, they use a code-reuse attack to perform malicious attack on electronic devices. Specifically, the code-reuse attack is an attack manner of hijacking a control process and using existing code fragments in electronic devices to piece together malicious programs.

Therefore, when faced with code-reuse attacks used by hackers, electronic devices carried with same boot images are easy to be attacked, that is, defenseless. With the increasing importance of information security issues, electronic devices with such defects need to be improved.

SUMMARY

In view of this, the disclosure provides a cloud deployment boot image electronic device, and a boot image cloud deployment system and method.

According to some embodiments, a boot image cloud deployment system includes an electronic device and a server. The server includes a storage medium and a control circuit. The electronic device is configured to issue a request instruction. The storage medium is configured to store a plurality of boot images. Each boot image includes a plurality of object files, and a combination sequence of the object files of each boot image is different from a combination sequence of the object files of the other boot images. The control circuit is configured to send back one of the boot images to the electronic device according to the request instruction. The electronic device executes the received boot image.

According to some embodiments, the electronic device includes a communications element and a controller. The controller is configured to execute an input/output system to initialize the communications element. The controller issues the request instruction after the communications element is initialized.

According to some embodiments, the storage medium further stores a plurality of pieces of source code corresponding to the electronic device. The control circuit is configured to: compile and assemble the source code into the object files, randomly arrange the object files, and establish link addresses corresponding to the object files, to obtain one of the boot images.

According to some embodiments, the storage medium further stores a plurality of pieces of source code corresponding to the electronic device. The server has a private key. The electronic device has a public key corresponding to the private key. The control circuit is configured to: compile and assemble the source code into the object files, randomly arrange the object files, establish link addresses corresponding to the object files, and sign the boot image by using the private key, to obtain one of the boot images. The electronic device verifies the received boot image by using the public key and executes the boot image.

According to some embodiments, a cloud deployment boot image electronic device includes a communications element and a controller. The controller is configured to execute an input/output system to initialize the communications element. The controller issues the request instruction after the communications element is initialized, and executes the received boot image.

According to some embodiments, the cloud deployment boot image electronic device further includes a public key. The cloud deployment boot image electronic device verifies the received boot image by using the public key and executes the boot image.

According to some embodiments, a boot image cloud deployment method is applicable to an electronic device and a server. The boot image cloud deployment method includes: issuing, by the electronic device, a request instruction; storing, by the server, a plurality of boot images, where each boot image includes a plurality of object files, and a combination sequence of the object files of each boot image is different from a combination sequence of the object files of the other boot images; sending back, by the server, one of the boot images to the electronic device according to the request instruction; and executing, by the electronic device, the received boot image.

According to some embodiments, before the issuing, by the electronic device, a request instruction, the boot image cloud deployment method includes: executing, by the electronic device, an input/output system to initialize a communications element of the electronic device; and issuing, by the electronic device, the request instruction after the communications element is initialized.

According to some embodiments, the boot image cloud deployment method further includes a boot image obtaining method. The boot image obtaining method includes: compiling and assembling a plurality of pieces of source code corresponding to the electronic device into the object files; randomly arranging the object files; establishing link addresses corresponding to the object files; and obtaining one of the boot images.

According to some embodiments, the boot image cloud deployment method further includes a boot image obtaining and verifying method. The boot image obtaining and verifying method includes: compiling and assembling a plurality of pieces of source code corresponding to the electronic device into the object files; randomly arranging the object files; establishing link addresses corresponding to the object files; signing the boot image by using a private key to obtain one of the boot images; and verifying the received boot image by using a public key and executing the boot image, where the public key corresponds to the private key.

In conclusion, according to the boot image cloud deployment system and method provided by some embodiments of the disclosure, a plurality of different boot images can be deployed on a server, and the server provides, according to a request instruction of an electronic device, one of the boot images to the electronic device to execute. The boot images deployed on the server are obtained by using randomly combined and arranged object files. Therefore, a combination sequence of the object files of each boot image is different. The server randomly provides any boot image to the electronic device, and therefore the electronic device can obtain different boot images. Because the boot image executed by the electronic device for each boot is different, the electronic device can be prevented from being attacked by hackers.

DETAILED DESCRIPTION

In the disclosure, the term "coupled" and derivatives thereof may be used. In some embodiments, "coupled" may be used to indicate that two or more elements are in direct physical contact or electrical contact with each other, or may indicate that two or more elements are in indirect electrical contact with each other. The term "coupled" may be still used to indicate that two or more elements cooperate or interact with each other.

Figure 1:
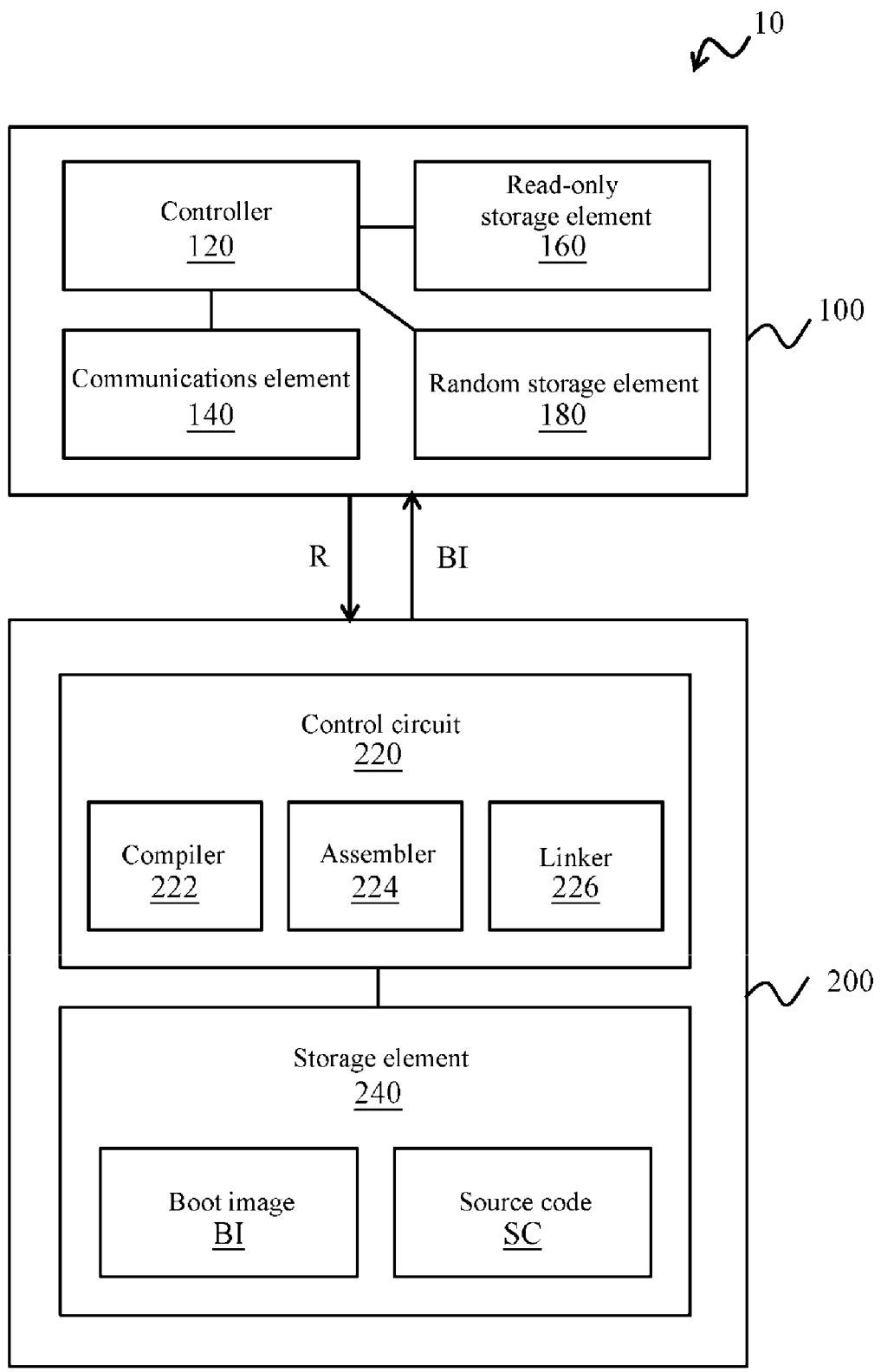
FIG. 1 is a schematic diagram of a boot image cloud deployment system according to some embodiments of the disclosure.

FIG. 1 is a schematic diagram of a boot image cloud deployment system 10 according to some embodiments of the disclosure. The boot image cloud deployment system 10 includes an electronic device 100 and a server 200. The electronic device 100 includes a controller 120, a communications element 140, a read-only storage element 160, and a random storage element 180. The server 200 includes a control circuit 220 and a storage medium 240. The electronic device 100 is configured to issue a request instruction R and execute a received boot image BI. The storage medium 240 of the server 200 is configured to store a plurality of boot images BI. The control circuit 220 of the server 200 is configured to send back one of the boot images BI to the electronic device 100 according to the request instruction R. The electronic device 100 and the server 200 transmit a signal or file to each other through a network. The transmission manner is not limited to a wired network or a wireless network. In the electronic device 100, the controller 120 is coupled to the communications element 140, the read-only storage element 160, and the random storage element 180. In the server 200, the control circuit 220 is coupled to the storage medium 240.

Figure 2:
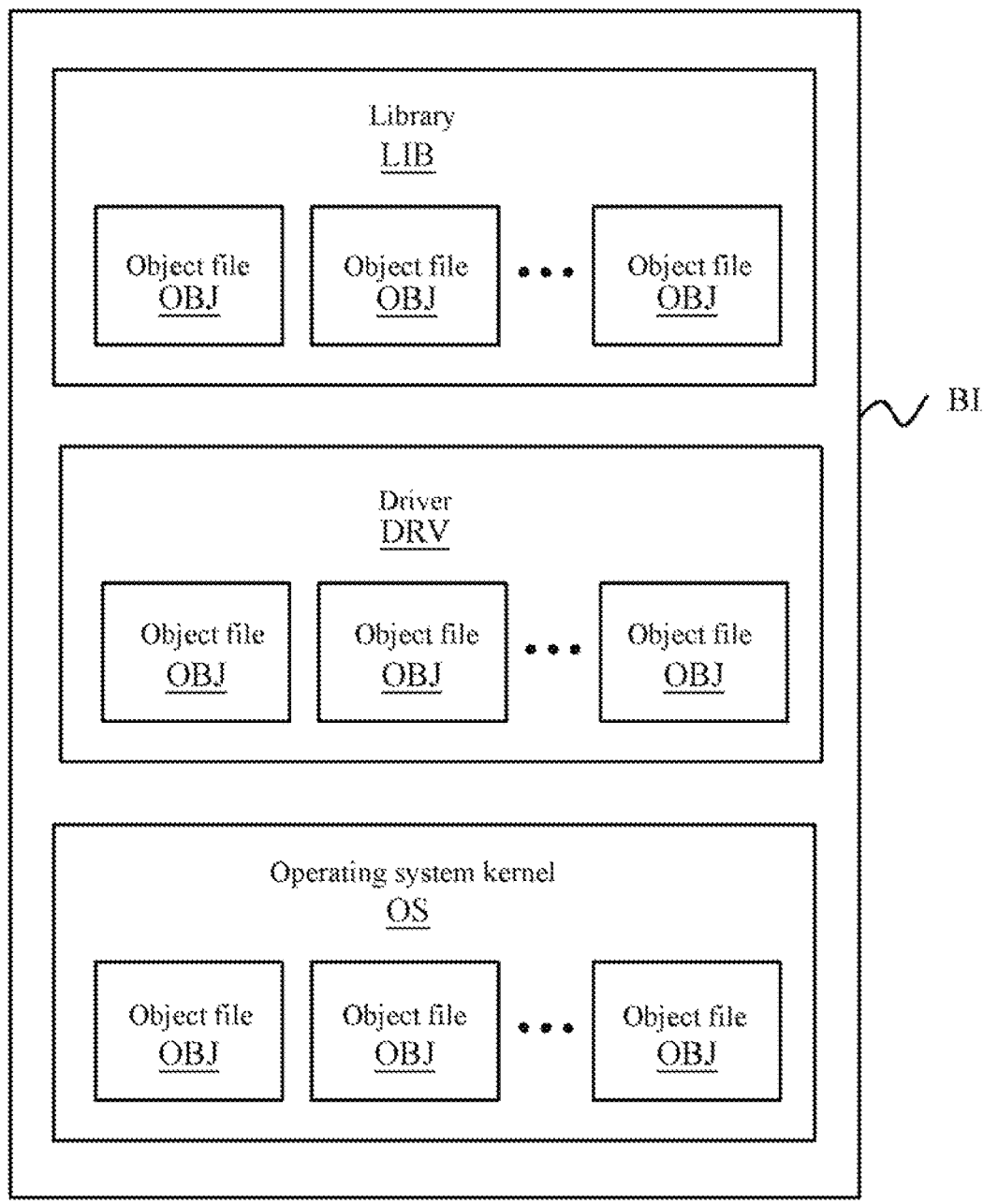
FIG. 2 is a schematic diagram of a boot image according to some embodiments of the disclosure.

FIG. 2 is a schematic diagram of a boot image BI according to some embodiments of the disclosure. Referring to FIG. 1 and FIG. 2 together, in some embodiments, each boot image BI includes a plurality of object files OBJ. A combination sequence of the object files OBJ of each boot image BI is different from a combination sequence of the object files OBJ of the other boot images BI. That is, the object files OBJ are combined in different sequences in each boot images BI. Therefore, each time the server 200 sends back one of the boot images BI to the electronic device 100, the combination sequences of the object files OBJ of the boot images BI received by the electronic device 100 are different. According to some embodiments, the server 200 randomly selects the boot image BI for the electronic device 100. Therefore, the electronic device 100 hardly receives the boot images BI of which the object files OBJ are combined in a same sequence.

Referring to FIG. 1, in some embodiments, the boot image cloud deployment system 10 is used to enable the electronic device 100 to obtain the boot image BI from the server 200 to execute a boot program. The electronic device 100 issues the request instruction R to the server 200. The server 200 sends back the boot image BI to the electronic device 100 according to the request instruction R. Specifically, the server 200 stores a plurality of boot images BI. The server 200 sends back any boot image BI to the electronic device 100 according to the request instruction R. It should be particularly noted that, according to some embodiments, although each boot image BI stored in the server 200 can be executed by the electronic device 100, the boot images BI are different because the boot images BI are obtained through randomly processing. The server 200 randomly provides different boot images BI to the electronic device 100. Each time the electronic device 100 issues the request instruction R, the boot image BI correspondingly received by the electronic device 100 is possibly different. Therefore, the electronic device 100 may not execute a same boot image BI each time to perform the boot program.

In some embodiments, the boot image BI is stored in the storage medium 240. The control circuit 220 is configured to receive the request instruction R and randomly select a boot image BI from the storage medium 240 according to the request instruction R to send back to the electronic device 100. According to some embodiments, the control circuit 220 randomly selects the boot image BI according to a random number generation program. For example, the random number generation program respectively outputs unrepeated random numbers to the boot images BI in the storage medium 240. Each boot image BI has a corresponding random number. The control circuit 220 selects a boot image BI having the maximum random number for the electronic device 100.

It should be particularly noted that, in some embodiments, the electronic device 100 is not limited to whether the electronic device 100 is carried with the boot images BI. When the electronic device 100 is not carried with the boot images BI, each time the electronic device 100 executes the boot program, the electronic device 100 issues the request instruction R to obtain the boot images BI. In some embodiments, the electronic device 100 does not issue the request instruction R when the electronic device 100 is powered on, but sends the request instruction R according to an update requirement of the electronic device 100. For example, the originally executed boot image BI has been used more than a particular use time limit or a particular quantity of use times.

In some embodiments, in a boot process of the electronic device 100, the electronic device 100 first executes a basic input/output system (BIOS), so that the request instruction R is issued only after the initialization of the communications element 140 is completed. Specifically, the controller 120 is configured to execute the input/output system to initialize the communications element 140 and issue the request instruction R after the communications element 140 is initialized. Specifically, the initialization of the communications element 140 represents enabling communication functions of the communications element 140, and is not limited to enabling the communications element 140 to normal communication functions or enabling only some communication functions (for example, enabling only some communication bandwidths, communication speeds, or communication manners). The communications element 140 is, for example, but not limited to, a wireless communications circuit, a wired communications circuit, or a circuit having both wireless communications and wired communications. In some embodiments, the request instruction R includes identification (ID) information of the electronic device 100. The ID information is, for example, but not limited to, a model, a sequence number, or related information that can be converted to a model or/and a sequence number of the electronic device 100. According to some embodiments, the read-only storage element 160 is configured to store the input/output system. The controller 120 obtains the input/output system from the read-only storage element 160 to execute initialization. The read-only storage element 160 is, for example, a read-only memory (ROM).

Referring to FIG. 1 and FIG. 2 together, in some embodiments, the electronic device 100 receives and runs the boot image BI to execute the boot program. Specifically, the boot image BI includes a library LIB, a driver DRV and an operating system (OS) kernel. The library LIB includes functions such as input/output, access, and mathematical operation. Therefore, the controller 120 executes the boot program to enable the operating system and software in the electronic device 100 to start running. According to some embodiments, the driver DRV is configured to enable the communications element 140 to normal communication functions. The random storage element 180 is configured to store the received boot image BI. The random storage element 180 is, for example, a random access memory (RAM).

In some embodiments, the control circuit 220 of the server 200 includes a compiler 222, an assembler 224, and a linker 226. The storage medium 240 of the server 200 is configured to store the boot images BI and a plurality of pieces of source code SC corresponding to the electronic device 100. The source code SC is code of the operating system and the software. The control circuit 220 converts the source code SC to a plurality of object files OBJ, then randomly arranges the sequence of the object files OBJ, and finally links the object files OBJ, to obtain the boot image BI. The process in which the source code SC is converted to the object files OBJ is completed through compiling of the compiler 222 and assembling of the assembler 224. The process of linking the object files OBJ into the boot image BI is completed by linking addresses of the object files OBJ by the linker 226 according to the arrangement sequence of the object files OBJ. According to some embodiments, the linker 226, for example, a GUN linker links the addresses of the object files OBJ by using a linker script in the GUN linker. It should be particularly noted that, the address of the object file OBJ is, for example, but not limited to, a physical location or a virtual location in the electronic device 100. The manner of linking the addresses of the object files OBJ is not limited to using independent jumpers or looking up a mapping table.

In some embodiments, each boot images BI stored in the storage medium 240 includes a plurality of object files OBJ. A combination sequence of the object files OBJ of any boot image BI is different from a combination sequence of the object files OBJ of the other boot images BI. That is, combination sequences of the object files OBJ of the boot images BI are different. Specifically, the boot image BI includes a library LIB, a driver DRV, and an OS kernel. Each of the library LIB, the driver DRV and the OS kernel includes a plurality of object files OBJ. In the process in which the control circuit 220 obtains the boot image BI, the control circuit 220 selects at least one of the library LIB, the driver DRV, and the OS kernel in the boot image BI to randomly arrange the object files OBJ. Moreover, the boot image BI may also be obtained by randomly arranging object files OBJ in the library LIB, the driver DRV, and the OS kernel, or randomly selecting two of the library LIB, the driver DRV, and the OS kernel to randomly arrange the object files OBJ.

Referring to FIG. 1, in some embodiments, the server 200 can pre-generate a certain quantity of boot images BI and store the boot images BI in the storage medium 240. In some embodiments, the server 200 can determine, according to a quantity of remaining boot images BI (that is, a quantity of the boot images BI that have not been sent back to the electronic device 100 for use), whether to generate more boot images BI to prepare. In some embodiments, when the server 200 receives the request instruction R, even if the storage medium 240 has not pre-produced boot images BI, the control circuit 220 can also produce the boot images BI according to the request instruction R, to provide the boot images to the electronic device 100.

In some embodiments, the electronic device 100 has a public key (not shown in the figure). The server 200 has a private key (not shown in the figure). The public key corresponds to the private key. A process in which the control circuit 220 of the server 200 obtains the boot image BI needs to be signed by using the private key. The controller 120 of the electronic device 100 verifies the received boot image BI by using the public key. Specifically, the control circuit 220 calculates one or more checksums or one or more hash values correspond to the boot image, merges the one or more checksums or the one or more hash values into the boot image, and signs the one or more checksums or the one or more hash values of the boot image BI by using the private key to form a digital signature. That is, the boot image BI has the digital signature for verification. The control circuit 220 then stores the boot image BI to the storage medium 240. That is, the boot image BI stored in the storage medium 240 has been signed. After the electronic device 100 obtains the boot image BI, the electronic device 100 verifies the digital signature of the boot image BI by using the public key, calculates the one or more checksums or the one or more hash values of the boot image BI, and compares the one or more checksums or the one or more hash values respectively to verify whether the digital signature is correct. When the digital signature is correct, the electronic device 100 can execute the verified boot image BI to execute the boot program. On the contrary, when the digital signature is incorrect, the electronic device 100 can re-issue the request instruction R to the server 200, to re-send back the unverified boot image BI. In some embodiments, when the digital signature is correct, the electronic device 100 stores the boot image BI to the random storage element 180. According to some embodiments, the control circuit 220 does not sign the boot image BI in a process of generating the boot image BI, but only after the control circuit 220 selects the boot image BI from the storage medium 240 to send back to the electronic device 100, the control circuit 220 signs the boot image BI by using the private key.

In some embodiments, the boot image cloud deployment system 10 is not limited to including one electronic device 100. For example, the boot image cloud deployment system 10 can include a plurality of electronic devices 100, and the electronic devices 100 are not limited to a single type of electronic devices 100. The server 200 respectively generates the boot images BI corresponding to the electronic devices 100 based on the source code SC corresponding to each electronic device 100. The request instruction R issued by the electronic device 100 has ID information. Therefore, the server 200 can provide corresponding boot images BI based on different electronic devices 100. According to some embodiments, the corresponding public key and private key in the boot image cloud deployment system 10 are not limited to one set. For example, the boot image cloud deployment system 10 can match public keys and private keys in different sets based on different types of the electronic devices 100. Alternatively, for a single specific electronic device 100, the boot image cloud deployment system 10 can provide a single set of the public key and the private key to distinguish the electronic device 100 from other electronic devices 100.

Figure 3:
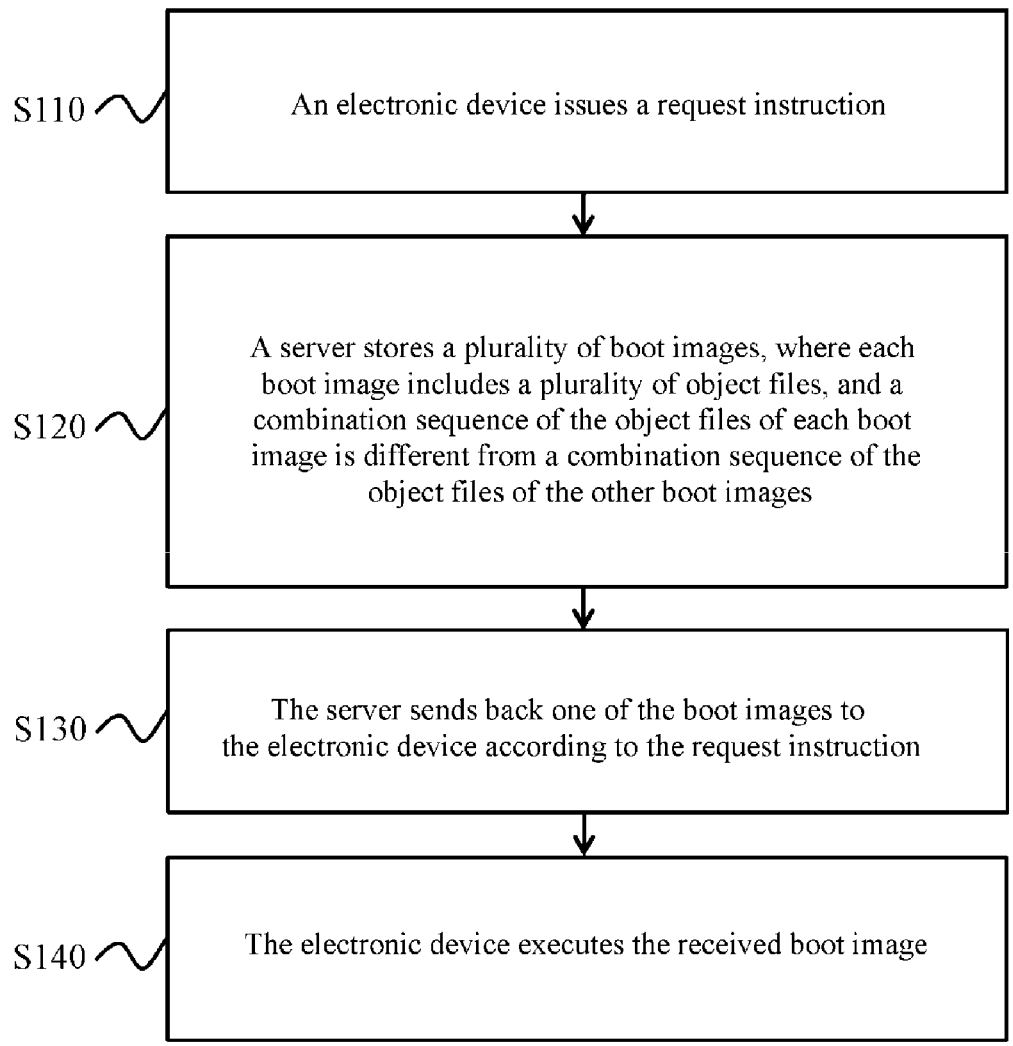
FIG. 3 is a flowchart of a boot image cloud deployment method according to some embodiments of the disclosure.

FIG. 3 is a flowchart of a boot image cloud deployment method according to some embodiments of the disclosure. Referring to FIG. 3, in some embodiments, the boot image cloud deployment method is applicable for an electronic device 100 and a server 200 to perform. The boot image cloud deployment method includes the following steps: The electronic device 100 issues a request instruction R (step S110); the server 200 stores a plurality of boot images BI, where each boot image BI includes a plurality of object files OBJ, and a combination sequence of the object files OBJ of each boot image BI is different from a combination sequence of the object files OBJ of the other boot images BI (step S120); the server 200 sends back one of the boot images BI to the electronic device 100 according to the request instruction R (step S130); and the electronic device 100 executes the received boot image BI (step S140).

Figure 4:
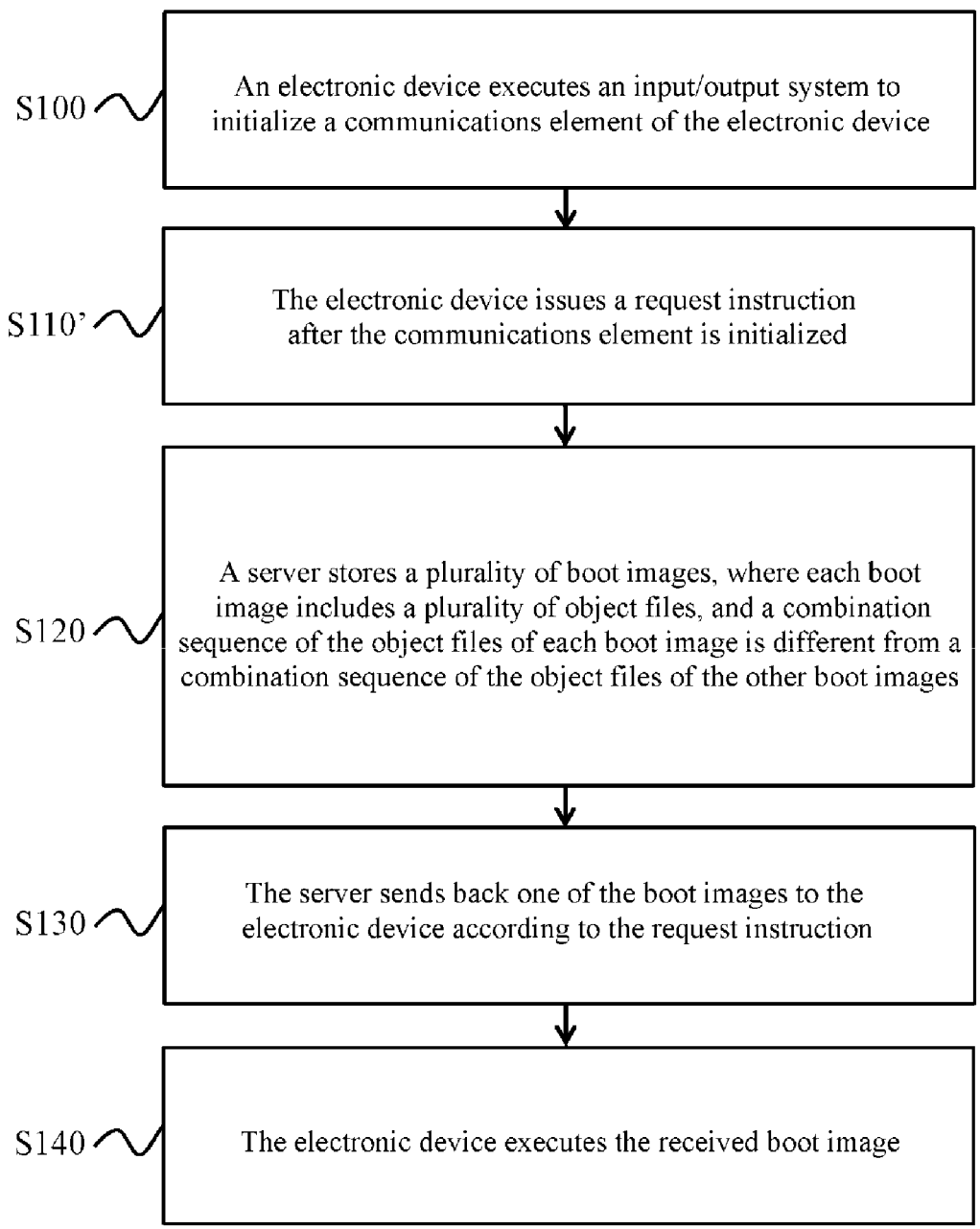
FIG. 4 is a flowchart of a boot image cloud deployment method according to some embodiments of the disclosure.

FIG. 4 is a flowchart of a boot image cloud deployment method according to some embodiments of the disclosure. Referring to FIG. 4, in some embodiments, the boot image cloud deployment method is applicable for an electronic device 100 and a server 200 to perform. The boot image cloud deployment method includes the following steps: The electronic device 100 executes an input/output system to initialize a communications element 140 of the electronic device (step S100); the electronic device 100 issues a request instruction R after the communications element 140 is initialized (step S110'); the server 200 stores a plurality of boot images BI, where each boot image BI includes a plurality of object files OBJ, and a combination sequence of the object files OBJ of each boot image BI is different from a combination sequence of the object files OBJ of the other boot images BI (step S120); the server 200 sends back one of the boot images BI to the electronic device 100 according to the request instruction R (step S130); and the electronic device 100 executes the received boot image BI (step S140).

In conclusion, according to the boot image cloud deployment system and method provided by some embodiments of the disclosure, a plurality of different boot images can be deployed on a server, and the server provides, according to a request instruction of an electronic device, one of the boot images to the electronic device to execute. The boot images deployed on the server are obtained by using randomly combined and arranged object files. Therefore, a combination sequence of the object files of each boot image is different. The server randomly provides any boot image to the electronic device, and therefore the electronic device can obtain different boot images. Because the boot image executed by the electronic device for each boot is different, the electronic device can be prevented from being attacked by hackers. In some embodiments, the boot image cloud deployment system and method further include a pair of corresponding public key and private key. The server signs the boot image by using the private key. The electronic device then verifies the boot image by using the public key. Therefore, the electronic device can further verify whether the boot image provided by the server is correct.

What is claimed is:

1. A boot image cloud deployment system, comprising:
an electronic device, configured to issue a request instruction; and
a server, comprising:
 a storage medium, configured to store a plurality of boot images configured for the same electronic device, wherein each boot image comprises a plurality of object files, and a combination sequence of the object files of each boot image is different from a combination sequence of the object files of the other boot images; and
 a control circuit, configured to send back one of the boot images to the electronic device according to the request instruction, wherein each time the combination sequence of the object files of the boot image sent back to the electronic device is different from the combination sequence of the object files of the boot image previously sent back to the electronic device, and the electronic device executes the received boot image from the control circuit.

2. The boot image cloud deployment system according to claim 1, wherein the electronic device comprises:
a communications element; and
a controller, configured to execute an input/output system to initialize the communications element and issue the request instruction after the communications element is initialized.

3. The boot image cloud deployment system according to claim 1, wherein the storage medium further stores a plurality of pieces of source code corresponding to the electronic device, and the control circuit is configured to: compile and assemble the source code into the object files, randomly arrange the object files, and establish link addresses corresponding to the object files, to obtain one of the boot images.

4. The boot image cloud deployment system according to claim 1, wherein the storage medium further stores a plurality of pieces of source code corresponding to the electronic device, the server has a private key, the electronic device has a public key corresponding to the private key, the control circuit is configured to: compile and assemble the source code into the object files, randomly arrange the object files, establish link addresses corresponding to the object files, and sign the boot image by using the private key, to obtain one of the boot images, and the electronic device verifies the received boot image by using the public key and executes the boot image.

5. A cloud deployment boot image electronic device, comprising:
   a communications element; and
   a controller, configured to execute an input/output system to initialize the communications element, wherein the controller issues the request instruction to a server to receive one of a plurality of boot images configured for the same electronic device, and the controller executes the boot image received from the server;
   wherein each boot image comprises a plurality of object files, and a combination sequence of the object files of each boot image is different from a combination sequence of the object files of the other boot images; and
   wherein each time the combination sequence of the object files of the boot image received from the server is different from the combination sequence of the object files of the boot image previously received from the server.

6. The cloud deployment boot image electronic device according to claim 5, further comprising a public key, wherein the cloud deployment boot image electronic device verifies the received boot image by using the public key and executes the boot image.

7. A boot image cloud deployment method, applicable to an electronic device and a server, wherein the boot image cloud deployment method comprises:
   issuing, by the electronic device, a request instruction;
   storing, by the server, a plurality of boot images configured for the same electronic device, wherein each boot image comprises a plurality of object files, and a combination sequence of the object files of each boot image is different from a combination sequence of the object files of the other boot images;
   sending back, by the server, one of the boot images to the electronic device according to the request instruction, wherein each time the combination sequence of the object files of the boot image sent back to the electronic device is different from the combination sequence of the object files of the boot image previously sent back to the electronic device; and
   executing, by the electronic device, the received boot image from the control circuit.

8. The boot image cloud deployment method according to claim 7, wherein before the issuing, by the electronic device, a request instruction, the boot image cloud deployment method comprises:
   executing, by the electronic device, an input/output system to initialize a communications element of the electronic device; and
   issuing, by the electronic device, the request instruction after the communications element is initialized.

9. The boot image cloud deployment method according to claim 7, further comprising a boot image obtaining method, comprising:
   compiling and assembling a plurality of pieces of source code corresponding to the electronic device into the object files;
   randomly arranging the object files;
   establishing link addresses corresponding to the object files; and
   obtaining one of the boot images.

10. The boot image cloud deployment method according to claim 7, further comprising a boot image obtaining and verifying method, comprising:
   compiling and assembling a plurality of pieces of source code corresponding to the electronic device into the object files;
   randomly arranging the object files;
   establishing link addresses corresponding to the object files;
   signing the boot image by using a private key to obtain one of the boot images; and verifying the received boot image by using a public key and executing the boot image, wherein the public key corresponds to the private key.

* * * * *